(12) United States Patent
Choi et al.

(10) Patent No.: US 7,718,329 B2
(45) Date of Patent: May 18, 2010

(54) METHOD OF FABRICATING LIQUID CRYSTAL DISPLAY DEVICE

(75) Inventors: Suk Choi, Gyeonggi-Do (KR); Soon Ju Jang, Seoul (KR); Byung Hoon Kim, Gyeonggi-Do (KR)

(73) Assignee: Hydis Technologies Co., Ltd., Gyeonggi-Do (KR)

( * ) Notice: Subject to any disclaimer, the term of this patent is extended or adjusted under 35 U.S.C. 154(b) by 88 days.

(21) Appl. No.: 12/099,630

(22) Filed: Apr. 8, 2008

(65) Prior Publication Data

US 2008/0254559 A1    Oct. 16, 2008

(30) Foreign Application Priority Data

Apr. 12, 2007  (KR) ...................... 10-2007-0035916

(51) Int. Cl.
*H01L 21/64* (2006.01)
(52) U.S. Cl. ................................. 430/30; 257/E21.535
(58) Field of Classification Search .................. 438/30, 438/48, 128, 149, 151, 157, 161, 283; 257/57, 257/59, 72, 83, 257, 290, 351, 368, 392; 252/299.01–299.7; 428/1.1–1.62
See application file for complete search history.

(56) References Cited

U.S. PATENT DOCUMENTS

| | | | |
|---|---|---|---|
| 6,879,361 B2 * | 4/2005 | Moon et al. ................. 349/114 |
| 6,946,679 B2 * | 9/2005 | Miwa et al. .................... 257/59 |
| 7,215,399 B2 * | 5/2007 | Lee et al. ........................ 257/59 |
| 7,348,222 B2 * | 3/2008 | Shimomura et al. ......... 257/347 |
| 7,364,808 B2 * | 4/2008 | Sato et al. ............. 257/E31.126 |
| 2007/0013648 A1 * | 1/2007 | Yamaguchi et al. ......... 345/102 |
| 2007/0151596 A1 * | 7/2007 | Nasuno et al. .............. 136/256 |

FOREIGN PATENT DOCUMENTS

| KR | 1020010003045 A | 1/2001 |
|---|---|---|
| KR | 1020050110541 A | 11/2005 |

* cited by examiner

*Primary Examiner*—David Vu
*Assistant Examiner*—Jonathan Han
(74) *Attorney, Agent, or Firm*—The Webb Law Firm

(57) ABSTRACT

Provided is a method of fabricating a liquid crystal display device. The method includes fabricating a liquid crystal panel divided into transmission and non-transmission regions, and including an upper substrate and a lower substrate, which are spaced apart from and opposite to each other, and a liquid crystal layer filled between the substrates, wherein the lower substrate has a plurality of thin film transistors; depositing a transparent conductive layer having a certain thickness on the upper substrate exposed to the exterior of the liquid crystal panel; and performing an etching process for removing the entire transparent conductive layer and a portion of the upper substrate to form irregular prominences and depressions on a surface of the upper substrate exposed to the exterior. Therefore, it is possible to improve readability and contrast ratio by diffusely reflecting external light and scattering internal light.

9 Claims, 5 Drawing Sheets

METHOD OF FABRICATING LIQUID CRYSTAL DISPLAY DEVICE

BACKGROUND OF THE INVENTION

1. Field of the Invention

The present invention relates, in general, to a method of fabricating a liquid crystal display device (LCD), and more particularly, to a method of fabricating a liquid crystal display device capable of improving readability and contrast ratio by diffusely reflecting external light and scattering internal light.

2. Description of the Related Art

In general, a liquid crystal display device (LCD) is a device using optical anisotropy of liquid crystal.

That is, the LCD is a device representing an image using characteristics capable of changing a molecule array of liquid crystal depending on the magnitude of an electric field upon application of a voltage and adjusting light according to the molecule array of the liquid crystal. The LCD includes upper and lower substrates, and a liquid crystal filled between the substrates.

In addition, as shown in FIG. 1, an upper polarizer 40 and a lower polarizer 10, having a film shape, are formed on an upper substrate 30 and under a lower substrate 20, respectively.

When a conventional film type polarizer is used, surface treatment is performed on an outer surface of the polarizing film to fabricate a polarizer having functions such as anti-reflection, anti-glare, anti-static, and so on. The polarizers are attached to outer surfaces of the upper substrate 30 and the lower substrate 20.

However, in the conventional art, an increase in price of a functional polarizer and an increase in process time due to addition of processes may cause an increase in cost of the liquid crystal panel and an increase in thickness of the liquid crystal panel due to the thickness of a compensation film or the functional polarizer, thereby lowering product competitiveness.

Meanwhile, FIG. 2 is a cross-sectional view of a liquid crystal display device, in which polarizers are attached to inner surfaces of substrates. When in-cell polarizers 30a and 20a attached to a lower surface of the upper substrate 30 and an upper surface of the lower substrate 20 are employed, the upper substrate 30 and the lower substrate 20 are directly exposed to the exterior to cause problems such as surface reflection, glare, and static electricity, in comparison with the case in which the functional polarizer is used as shown in FIG. 1.

Reference numerals 21 and 31 designate insulating substrates, reference numeral 23 designates a pixel electrode, reference numeral 33 designates a color filter layer, reference numeral 35 designates a common electrode, and reference numeral 50 designates a liquid crystal layer.

SUMMARY OF THE INVENTION

Accordingly, the present invention has been made keeping in mind the above problems occurring in the related art, and an object of the present invention is to provide a method of fabricating a liquid crystal display device capable of improving readability and contrast ratio by diffusely reflecting external light and scattering internal light.

In order to achieve the above object, according to one aspect of the present invention, there is provided a method of fabricating a liquid crystal display device including: (a) fabricating a liquid crystal panel divided into transmission and non-transmission regions, and including an upper substrate and a lower substrate, which are spaced apart from and opposite to each other, and a liquid crystal layer filled between the substrates, wherein the lower substrate has a plurality of thin film transistors; (b) depositing a transparent conductive layer having a certain thickness on the upper substrate exposed to the exterior of the liquid crystal panel; and (c) performing an etching process for removing the entire transparent conductive layer and a portion of the upper substrate to form irregular prominences and depressions on a surface of the upper substrate exposed to the exterior.

Here, when the transparent conductive layer is formed of indium tin oxide (ITO), a hydrofluoric (HF) acid-based etchant may be used.

In step (b), the transparent conductive layer may have a thickness of 40 to 120 nm.

According to another aspect of the present invention, there is provided a method of fabricating a liquid crystal display device including: (a') fabricating a liquid crystal panel divided into transmission and non-transmission regions, and including an upper substrate and a lower substrate, which are spaced apart from and opposite to each other, and a liquid crystal layer filled between the substrates, wherein the lower substrate has a plurality of thin film transistors; (b') depositing a transparent conductive layer having a certain thickness on the upper substrate exposed to the exterior of the liquid crystal panel; (c') patterning the transparent conductive layer using a photolithography process to form a transparent conductive pattern corresponding to the non-transmission region; and (d') performing an etching process for removing the entire transparent conductive layer and a portion of the upper substrate to form irregular prominences and depressions on a surface of the upper substrate, on which the transparent conductive pattern is formed.

Here, when the transparent conductive layer is formed of indium tin oxide (ITO), a hydrofluoric (HF) acid-based etchant may be used.

In step (b'), the transparent conductive layer may have a thickness of 40 to 120 nm.

In step (d'), during the etching process, a portion of the upper substrate, on which the transparent conductive layer is not formed, may be removed without forming the prominences and depressions.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

Embodiment 1

Figure 1:
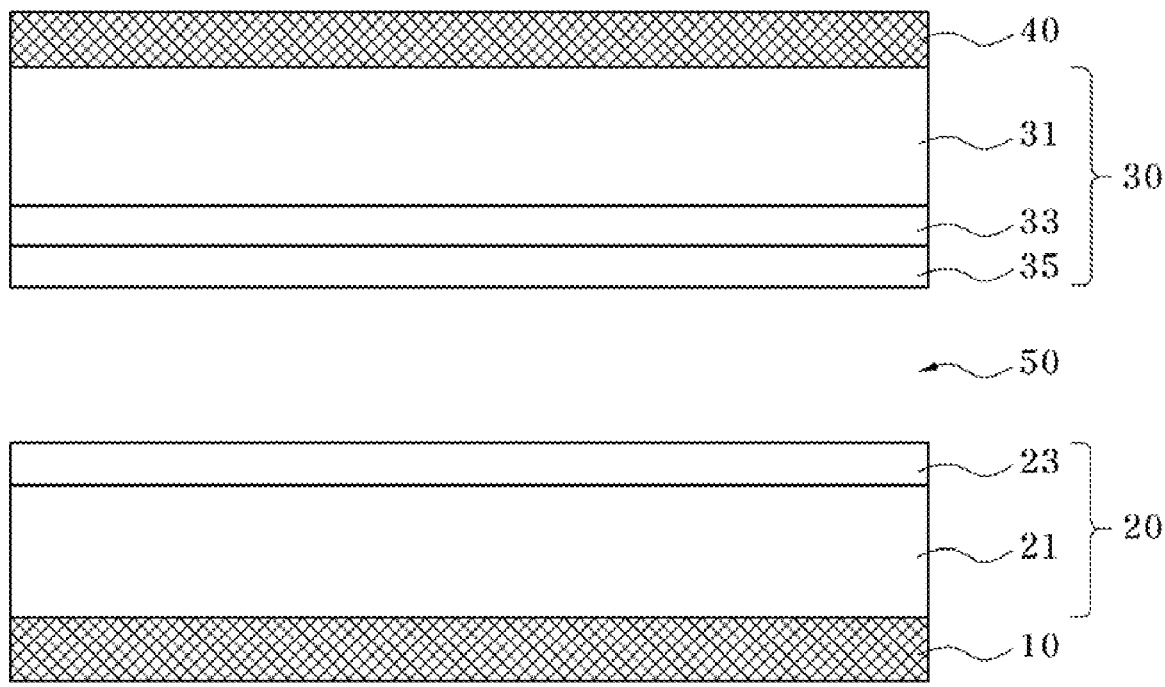
FIG. 1 is a cross-sectional view of a conventional liquid crystal display device, in which a functional polarizer is attached to the exterior of a substrate.
Figure 2:
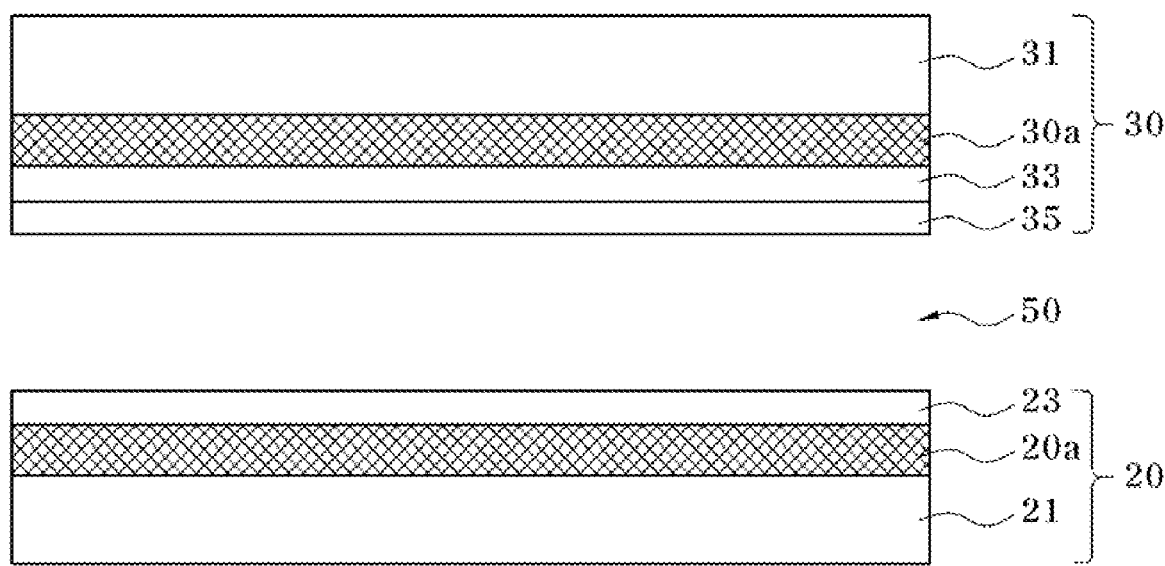
FIG. 2 is a cross-sectional view of a conventional liquid crystal display device, in which a functional polarizer is attached to the interior of a substrate.
Figure 3A:
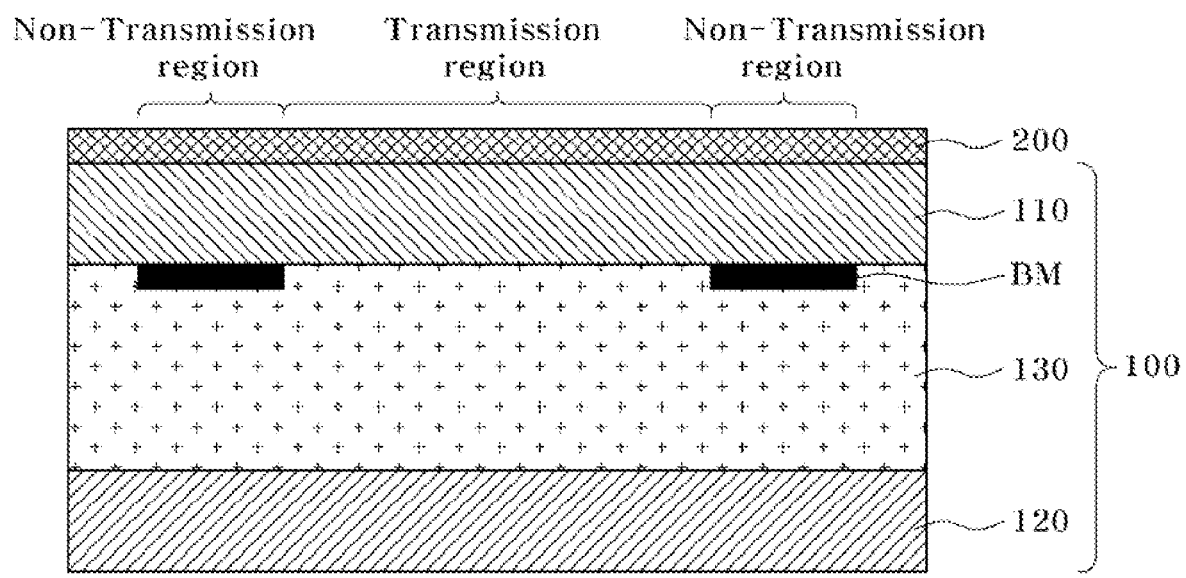
FIGS. 3A to 3C are cross-sectional views illustrating a method of fabricating a liquid crystal display device in accordance with a first exemplary embodiment of the present invention.
Figure 3B:
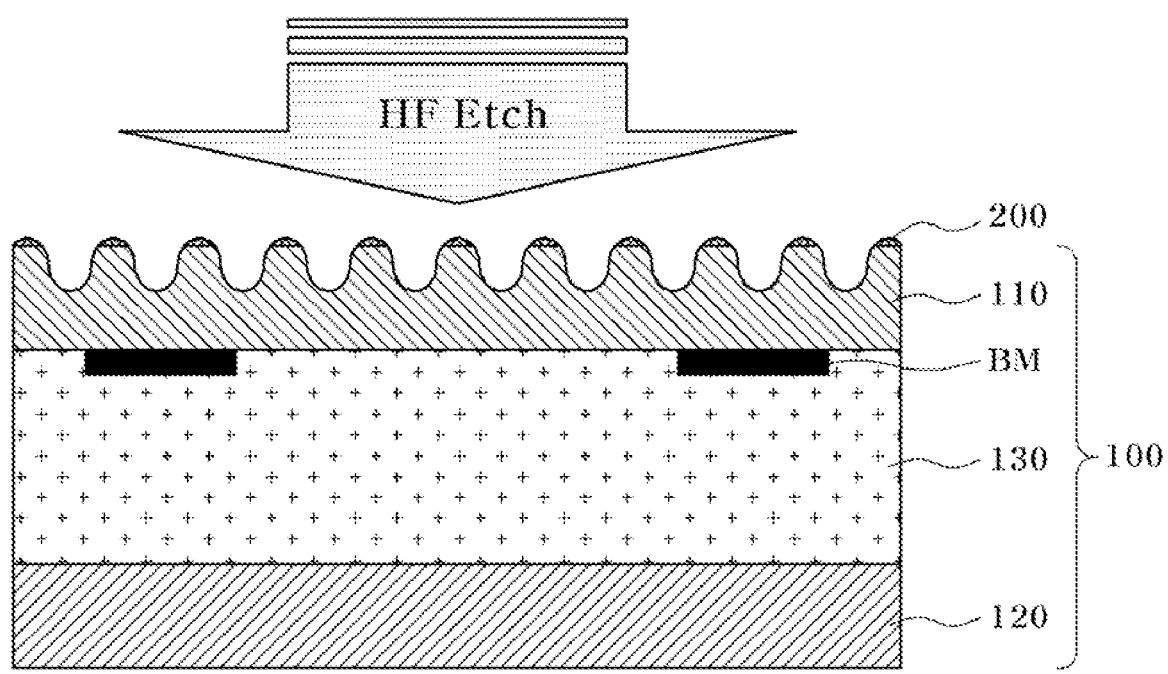
Figure 3C:
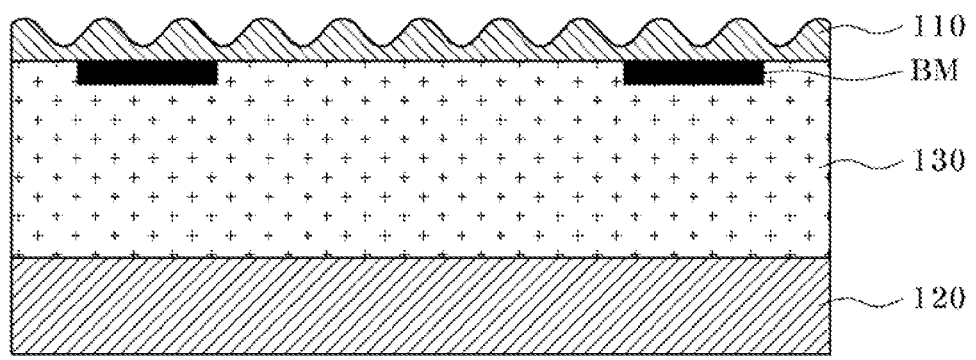

FIGS. 3A to 3C are cross-sectional views illustrating a method of fabricating a liquid crystal display device in accordance with a first exemplary embodiment of the present invention.

Referring to FIG. 3A, first, an upper substrate 110, on which a plurality of color filters (not shown) and black matrices (BM) are formed, and a lower substrate 120, on which a plurality of thin film transistors (TFT, not shown) are formed, are spaced apart from and opposite to each other, and a liquid crystal layer 130 is filled between the substrates. A liquid crystal panel 100 divided into a transmission region and a non-transmission region is manufactured, and then, a transparent conductive layer, for example, an indium tin oxide (ITO) layer 200 is formed on the upper substrate 110 exposed to the exterior of the liquid crystal panel 100 to have a predetermined thickness using a general sputtering method.

At this time, the ITO layer 200 may be formed to a thickness of about 40 to 120 nm. As a result, haze is formed to reduce a specular reflection effect of surface reflection and increase a diffused reflection effect. When the ITO layer 200 is too thin, the haze cannot be properly formed not to generate the diffused reflection effect. When the ITO layer 200 is too thick, the haze becomes larger and thus the diffused reflection effect is increased, but transmissivity is largely decreased to cause a reduction in characteristics. For this reason, in order to minimize loss in transmissivity and sufficiently induce the diffused reflection effect, the ITO layer 200 is formed to a thickness of about 40 to 120 nm.

Here, while not shown, the color filters are formed of patterns of red (R), green (G), and blue (B) disposed between the black matrices BM. The color filters function to provide color to light irradiated from a back light unit (not shown) and passed through the liquid crystal layer 130. The color filter is generally formed of a photosensitive organic material.

In addition, an overcoat layer (not shown) may be formed on the color filter to remove a step difference generated by the color filter to improve planarity.

The black matrices BM are formed on a surface of the upper substrate 110 in contact with the liquid crystal layer 130 to prevent light leakage. The black matrices generally divide the color filter into red (R), green (G) and blue (B), and are typically formed of a photosensitive organic material to which black pigment has been added.

In addition, while not shown, the lower substrate 120 is generally referred to as a thin film transistor array substrate, A plurality of thin film transistors are disposed thereon in a matrix manner as switching devices, and gate lines and data lines are formed to intersect the plurality of thin film transistors.

Meanwhile, since the liquid crystal panel 100 applied to an exemplary embodiment of the present invention is schematically shown, and specific structures and manufacturing methods of basic components formed on the upper substrate 110 and the lower substrate 120, which are not shown (for example, a color filter, a spacer, a common electrode, a pixel electrode, source/drain electrodes, and so on) are the same as the conventional liquid crystal display device, detailed descriptions thereof will be omitted.

Referring to FIG. 3B, a hydrofluoric (HF) acid-based etchant is used on the entire surface of the resultant structure, i.e., the liquid crystal panel 100, to etch the liquid crystal panel 100 for a certain time (preferably, about 1 to 5 minutes). At this time, the liquid crystal panel 100 is etched to have irregularities smaller than micron size due to structural characteristics of the ITO layer 200.

That is, while partially formed during initial etching, prominences and depressions R are initially formed on the upper substrate 110 in an embossed manner due to ITO, which is amorphous, having different etch rates.

Then, when a certain time (for example, about 10 to 30 minutes) has elapsed, as shown in FIG. 3C, the ITO layer 200 is entirely etched, and the upper substrate 110 is also partially etched along with the ITO layer 200.

As a result, the irregular prominences and depressions R are formed on the surface of the upper substrate 110 in a micron size to decrease specular reflection by external light, thereby improving readability and obtaining a good contrast ratio (CR).

Meanwhile, the etching process using such a hydrofluoric acid-based etchant may be simultaneously performed on upper and lower parts of the liquid crystal panel 100.

In addition, the etching process using such a hydrofluoric acid-based etchant may be performed before performing a color filter process on the upper substrate 110.

Further, an anti-reflective (AR) or low reflectance (LR) polarizer may be attached to the upper substrate 110 and additionally anti-reflective coating may be performed on the upper substrate 110 to constitute an anti-glare/anti-reflective (AR) polarizer.

Figure 4:
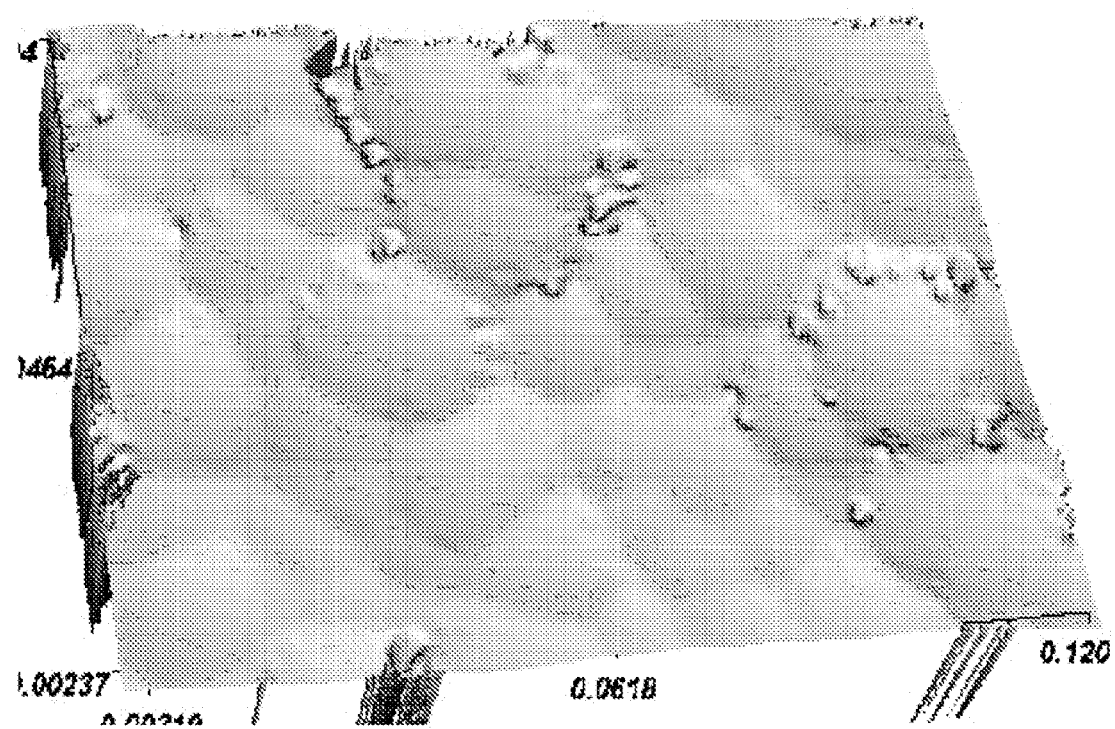
FIG. 4 is a view showing an embodied example of FIG. 3C.

FIG. 4 is a view showing an embodied example of FIG. 3C, also showing measurement results through a three-dimensional measurement device of a glass surface embodied by the method proposed in the first embodiment of the present invention.

Referring to FIG. 4 to examine the surface of the upper substrate 110, irregular etching of the ITO layer 200 forms a negative-type embossing having various widths of about 5 to 60 μm, heights of about 2 to 50 μm, and angles of about 2 to 30°.

In addition, the haze has a value of about 10 to 50% to accomplish effects of the anti-glare film or functional polarizer.

Embodiment 2

Figure 5A:
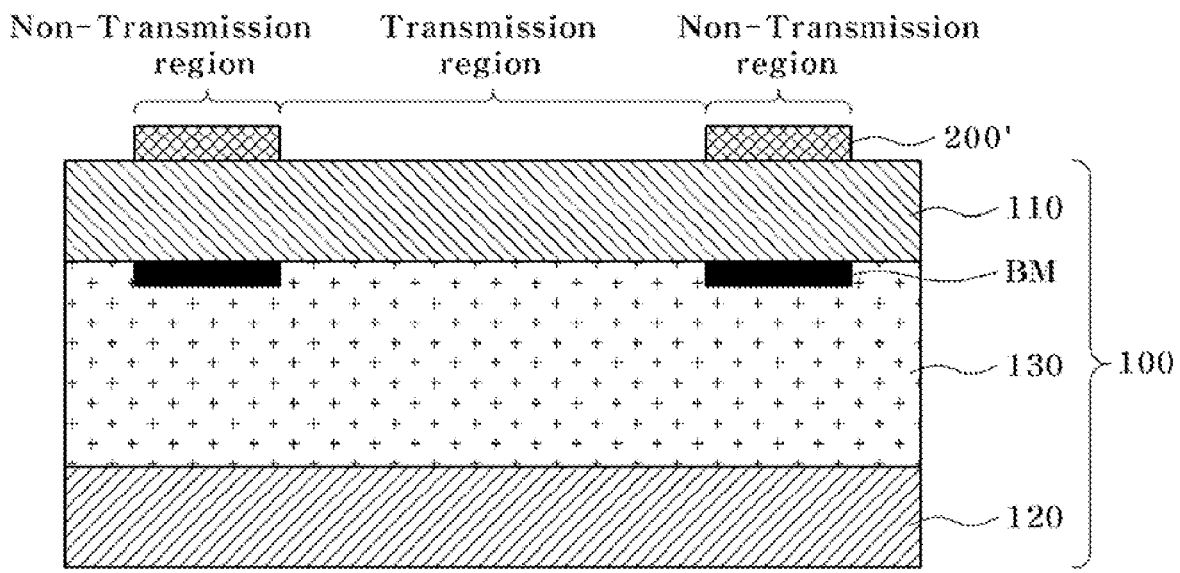
FIGS. 5A to 5C are cross-sectional views illustrating a method of fabricating a liquid crystal display device in accordance with a second exemplary embodiment of the present invention.
Figure 5B:
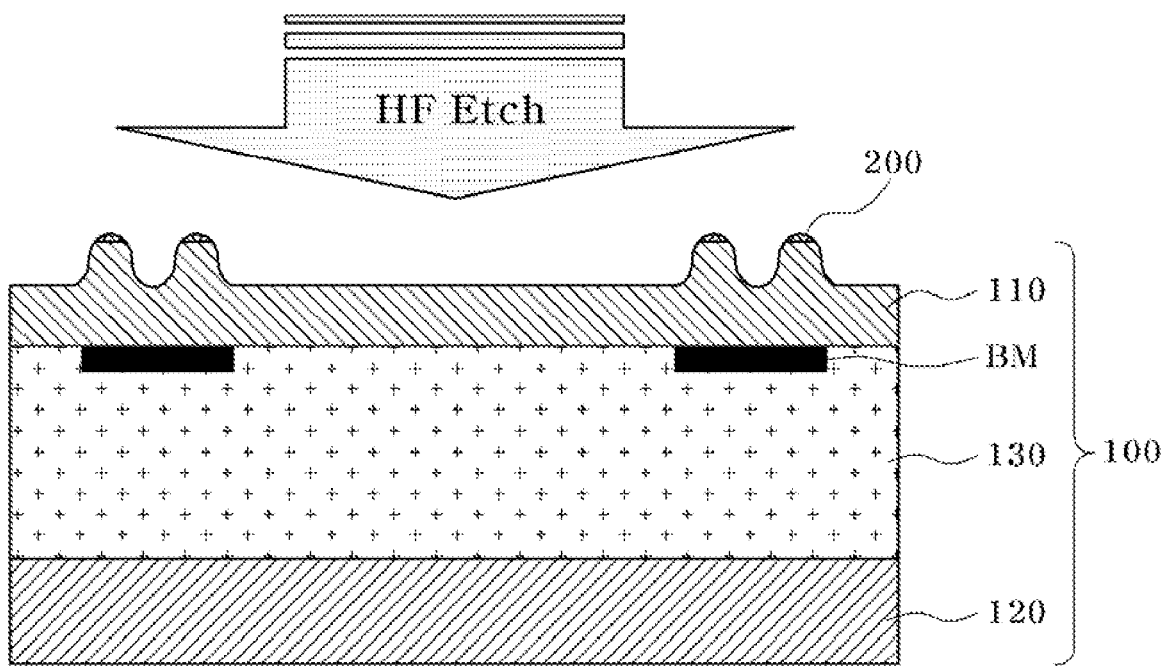
Figure 5C:
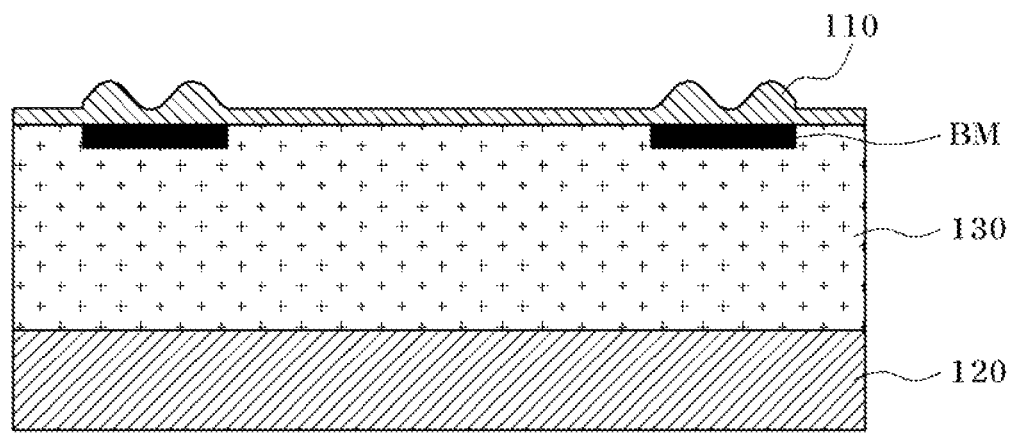
Figure 6:
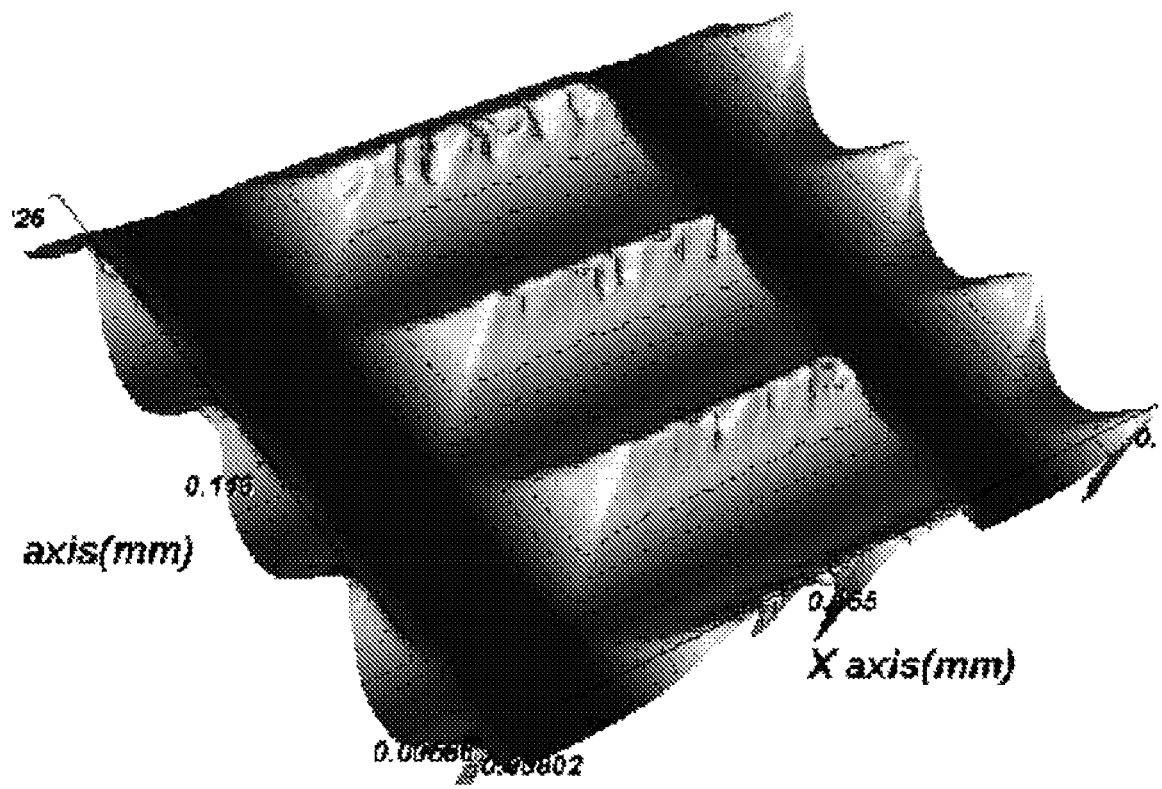
FIG. 6 is a view showing an embodied example of FIG. 5C.

FIGS. 5A to 5C are cross-sectional views illustrating a method of fabricating a liquid crystal display device in accordance with a second exemplary embodiment of the present invention, and FIG. 6 is a view showing an embodied example of FIG. 5C.

Descriptions of the same specific structure and manufacturing method as the first exemplary embodiment in the liquid crystal panel 100 applied to the second exemplary embodiment of the present invention will not be repeated.

Referring to FIG. 5A, after manufacturing the liquid crystal panel 100 divided into a transmission region and a non-transmission region, a transparent conductive layer through which light can readily pass, for example, an indium tin oxide (ITO) layer is formed to a predetermined thickness on the upper substrate 110 exposed to the exterior of the liquid crystal to panel 100 using a general sputtering method. Then, the ITO layer is patterned using a general photolithography process to form a black matrix BM, i.e., an ITO pattern 200' corresponding to the non-transmission region.

Referring to FIG. 5B, a hydrofluoric (HF) acid-based etchant is used on the entire surface of the resultant structure, i.e., the liquid crystal panel 100 to etch the liquid crystal panel 100 for a certain time (preferably, about 1 to 5 minutes). At this time, the liquid crystal panel 100 is etched to have irregularities smaller than micron size due to structural characteristics of the ITO pattern 200'.

That is, while partially formed during initial etching, prominences and depressions R are initially formed on the upper substrate 110 in an embossed manner due to ITO, which is amorphous, having different etch rates.

Then, when a certain time (for example, about 10 to 30 minutes) has elapsed, as shown in FIG. 5C, the ITO pattern 200' is entirely etched, and the upper substrate 110 is also partially etched along with the ITO pattern 200'.

At this time, since the transmission region is etched to remove a portion of the upper substrate 110 without the prominences and depressions R, it is possible to prevent a decrease in transmissivity. In addition, the non-transmission region is etched to form prominences and depressions R in a micron size on the surface of the upper substrate 110 to make it possible to reduce specular reflection by external light and thereby improve readability, transmissivity, and contrast ratio (CR).

Meanwhile, the etching process using such a hydrofluoric acid-based etchant may be simultaneously performed on upper and lower parts of the liquid crystal panel 100.

In addition, the etching process using such a hydrofluoric acid-based etchant may be performed before performing a color filter process on the upper substrate 110.

Further, an anti-reflective (AR) or low reflectance (LR) polarizer may be attached to the upper substrate 110 and additionally anti-reflective coating may be performed on the upper substrate 110 to constitute an anti-glare/anti-reflective (AR) polarizer.

FIG. 6 is a view showing an embodied example of FIG. 5C, also showing measurement results through a three-dimensional measurement device of a glass surface embodied by the method proposed in the second embodiment of the present invention.

Referring to FIG. 6, the resultant embossing has a width of about 5 to 60 μm, and a height of about 2 to 10 μm.

According to the exemplary embodiment of the present invention, after depositing the transparent conductive layer on the surface of the upper substrate 110 exposed to the exterior, the transparent conductive layer and the substrate are simultaneously etched to form more irregular and fine prominences and depressions on the substrate, thereby preventing glare to obtain good readability and image clearness. In addition, reflection of the external light is excluded to accomplish a good contrast ratio.

The method in accordance with the present invention can lower a reflection ratio to about 50% in comparison with the conventional method of directly etching the substrate to lower a surface reflection ratio.

In addition, the method in accordance with the present invention can reduce cost and provide advantages in product competitiveness in comparison with the conventional method using a compensation film or a functional polarizer.

Further, since both sides of the substrate are etched by performing surface treatment for readability, it is possible to reduce the thickness of the substrate and increase transmissivity.

Meanwhile, the method of fabricating a liquid crystal display device in accordance with an exemplary embodiment of the present invention may be applied to all liquid crystal display devices using optical anisotropy and polarization of liquid crystal, in addition to the conventional in-plan switching (IPS) or fringe field switching (FFS) mode liquid crystal display device.

As can be seen from the foregoing, in accordance with a method of fabricating a liquid crystal display device of the present invention, after depositing a transparent conductive layer on an upper substrate of a liquid crystal panel exposed to the exterior, the transparent conductive layer and the substrate are simultaneously etched to form a more irregular surface on the substrate, thereby preventing glare to improve readability, image clarity, and contrast ratio.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of fabricating a liquid crystal display device, comprising:
   (a) fabricating a liquid crystal panel divided into transmission and non-transmission regions, and including an upper substrate and a lower substrate, which are spaced apart from and opposite to each other, and a liquid crystal layer filled between the substrates, wherein the lower substrate has a plurality of thin film transistors;
   (b) depositing a transparent conductive layer having a certain thickness on the upper substrate exposed to the exterior of the liquid crystal panel; and
   (c) performing an etching process for removing the entire transparent conductive layer and a portion of the upper substrate to form irregular prominences and depressions on a surface of the upper substrate exposed to the exterior, wherein the irregular prominences and depressions on the surface of the upper substrate are caused by prominences and depressions initially formed in the transparent conductive layer during the etching process.

2. The method as set forth in claim 1, wherein, when the transparent conductive layer is formed of indium tin oxide (ITO), a hydrofluoric (HF) acid-based etchant is used.

3. The method as set forth in claim 1, wherein, in step (b), the transparent conductive layer has a thickness of 40 to 120 nm.

4. The method as set forth in claim 1, wherein, in step (c), the etching process is performed to remove a portion of the lower substrate therewith.

5. A method of fabricating a liquid crystal display device, comprising:
   (a) fabricating a liquid crystal panel divided into transmission and non-transmission regions, and including an upper substrate and a lower substrate which are spaced apart from and opposite to each other, and a liquid crystal layer filled between the substrates, wherein the lower substrate has a plurality of thin film transistors;
   (b) depositing a transparent conductive layer having a certain thickness on the upper substrate exposed to the exterior of the liquid crystal panel;
   (c) patterning the transparent conductive layer using a photolithography process to form a transparent conductive pattern corresponding to the non-transmission region; and (d) performing an etching process for removing the entire transparent conductive layer and a portion of the upper substrate to form irregular prominences and depressions on a surface of the upper substrate on which the transparent conductive pattern is formed, wherein the irregular prominences and depressions on the surface of the upper substrate are caused by prominences and depressions initially formed in the transparent conductive layer during the etching process.

6. The method as set forth in claim 5, wherein, when the transparent conductive layer is formed of indium tin oxide (ITO), a hydrofluoric (HF) acid-based etchant is used.

7. The method as set forth in claim 5, wherein, in step (b), the transparent conductive layer has a thickness of 40 to 120 nm.

8. The method as set forth in claim 5, wherein, in step (d), the etching process is performed to remove a portion of the lower substrate therewith.

9. The method as set forth in claim 5, wherein, in step (d), during the etching process, a portion of the upper substrate, on which the transparent conductive layer is not formed, is removed without forming the prominences and depressions.

* * * * *